United States Patent [19]

Heilweil et al.

[11] Patent Number: 4,923,617
[45] Date of Patent: May 8, 1990

[54] PROCESS FOR INHIBITING SCALE FORMATION

[75] Inventors: Israel J. Heilweil, Princeton, N.J.; Gerald L. Shoemaker, Aurora, Ohio

[73] Assignee: Mobil Oil Corporation, New York, N.Y.

[21] Appl. No.: 284,823

[22] Filed: Dec. 14, 1988

Related U.S. Application Data

[63] Continuation of Ser. No. 128,305, Dec. 3, 1987, abandoned.

[51] Int. Cl.$^5$ ................................................ C02F 5/10
[52] U.S. Cl. ................................. 210/698; 166/244.1; 252/180
[58] Field of Search ................. 166/244.1, 279, 310; 210/698–701; 252/180, 181

[56] References Cited

U.S. PATENT DOCUMENTS

| | | | |
|---|---|---|---|
| 2,744,866 | 5/1956 | Kahler | 210/698 |
| 3,140,915 | 7/1964 | Axelrad et al. | 210/698 |
| 3,400,078 | 9/1968 | Jones | 252/180 |
| 3,523,582 | 8/1970 | Fulford | 166/305 |
| 3,584,686 | 6/1971 | Fulford | 166/275 |
| 3,596,766 | 8/1971 | Johnston | 210/698 |
| 3,630,937 | 12/1971 | Baum et al. | 210/698 |
| 3,650,970 | 3/1972 | Pratt et al. | 252/180 |
| 3,656,551 | 4/1972 | Biles | 166/279 |
| 3,703,928 | 11/1972 | Fulford | 166/275 |
| 3,712,863 | 1/1973 | Bundrant et al. | 252/8.55 E |
| 3,782,469 | 1/1974 | Fulford | 166/279 |
| 3,849,328 | 11/1974 | Schievelbein et al. | 210/698 |
| 3,879,288 | 4/1975 | Siegele | 252/180 |
| 3,951,793 | 4/1976 | Tate et al. | 210/698 |
| 3,979,315 | 9/1976 | Tate et al. | 210/698 |
| 4,003,842 | 1/1977 | Sven et al. | 252/180 |
| 4,032,460 | 6/1972 | Zilch et al. | 252/8.55 E |
| 4,155,857 | 5/1979 | Jones | 252/8.55 E |
| 4,556,493 | 12/1985 | Cuisia | 210/698 |
| 4,590,996 | 5/1986 | Hoskin et al. | 166/244.1 |
| 4,652,377 | 3/1987 | Amjad | 210/699 |
| 4,710,303 | 12/1987 | Emmons | 210/701 |

OTHER PUBLICATIONS

Kirk–Othmer—Encyclopedia of Chemical Technology—Third Edition—vol. 5—Cellulose Derivatives—Esters—pp. 129–143.

Primary Examiner—Peter Hruskoci
Attorney, Agent, or Firm—Alexander J. McKillop; Charles J. Speciale; Michael J. Mlotkowski

[57] ABSTRACT

A process for inhibiting the formation of scale in process equipment and conduits that form because of the presence of scale forming salts present in process fluids flowing therein is provided. In this process a scale inhibiting effective amount of an inhibiting agent selected from the group consisting of polymeric sulfates, polymeric sulfonates and mixtures thereof is added to the process fluid.

7 Claims, No Drawings

PROCESS FOR INHIBITING SCALE FORMATION

BACKGROUND OF THE DISCLOSURE

This is a continuation of copending application Ser. No. 128,305 filed on Dec. 3, 1987, now abandoned.

1 Field of the Invention

The instant invention is directed to a process for inhibiting scale formation. More particularly, the instant invention is directed to a process for inhibiting scale formation on the inside surfaces of process equipment and conduits in which flow scale prone process fluids by adding polymeric sulfates and sulfonates to the process fluid.

2. Background of the Prior Art

The formation of scale in process equipment and conduits has long been appreciated as a major problem in the process industries. This problem is especially pronounced when the process fluid, from which the scale is deposited, is at elevated temperature. Although there are scale inhibitors which are effective at ambient and moderate temperatures these scale inhibiting agents oftentimes breakdown at elevated temperature.

Those skilled in the art are aware that among process fluids that typically flow at elevated temperature are fluids extracted from oil-bearing formations. Thus, it is not surprising that oil production equipment and conduits are subject to scale formation that has adverse effects on production efficiency. This problem is particularly emphasized in off-shore oil-production equipment. Those formations, because of the presence of sea water, are especially apt to contain salts of the type that create scale formation on the inside walls of production equipment, pipes, tubing and the like. Those skilled in the art are aware that fluids extracted from undersea formations are at elevated temperatures.

The above remarks suggest the important function of scale inhibitors. The alternative to scale inhibition, scale removal, is not only expensive in terms of downtime and the actual costs of these operations, but is oftentimes unavailing. For example, mechanical descaling methods such as by use of scrappers, brushes, high pressure abrasion jets and the like are expensive, tedious and, most important, of limited effectiveness. Chemical descaling procedures provide mixed results. Usually, chemical scale removers are acid materials which dissolve mineral scale which form from basic compounds. Acid descalers are thus effective in removing a very important class of mineral scale, calcium carbonate. Other scale formations, however, such as alkaline earth metal sulfates, not being basic, are not appreciably soluble in acids. Such scale requires a first stage treatment with such materials as ammonium salts, polyphosphates, hydroxides and the like followed by acid washing.

In summary, the procedures involved in scale removal are difficult and expensive at best and ineffective at worst. However, the methods of the prior art utilized in the alternative procedure of scale inhibition have, similarly, not been effective in controlling scale formation in applications that are only now becoming important commercial activities.

Very little activity is reported in the prior art directed to the use of polymeric sulfates and polymeric sulfonates as scale inhibitors. Probably, the most significant development in the prior art related to compounds remotely related to these polymers as inhibiting agents is the disclosure in U.S. Pat. No. 3,849,328 to Shievelbein et al. That reference discloses the addition of sulfonated alkali lignins to scale-prone waters. The resultant aqueous solution is recited to protect conduits, in which said scale-prone water flows, from the formation of scale.

Lignin, a natural product found in wood, is a complex phenolic polyether containing many functional groups. The alkali lignins used in the '328 patent are one of two classes of lignins extracted from wood, the other being sulfite lignins. It is only sulfonated alkali lignins that prove effective in this application. Sulfite lignins are unsuccessful as scale inhibitors.

The degree of success obtained by the use of aqueous solutions of sulfonated alkali lignins is only moderate. Therefore, the search for other, more effective scale inhibiting agents has continued. This search has focused on mineral scale inhibiting additives which are effective at low concentration and at elevated temperatures.

BRIEF SUMMARY OF THE INVENTION

A new process has now been found for inhibiting mineral scale formation in process equipment and conduits in which scale-prone process fluids flow. This new process is an advance in the art in that the concentration required to inhibit scale is considerably reduced compared to the methods of the prior art and is effective at elevated temperatures where other prior art scale inhibitors breakdown.

In accordance with the present invention a process for inhibiting inorganic scale in conduits is provided. In this process a scale inhibiting effective amount of a polymer selected from the group consisting of polymeric sulfates, polymeric sulfonates and mixtures thereof is added to the scale-prone process fluid flowing in the process equipment and conduits to be protected.

DETAILED DESCRIPTION

The present invention is directed to a process for inhibiting the deposition of inorganic scale on the surfaces of process equipment and conduits used to operate on and transport process fluids which contain precipitate-forming salts flowing under conditions in which ions of such salts react, precipitate and form scale. To accomplish this, a scale inhibiting effective amount of a scale inhibiting agent selected from the group consisting of polymeric sulfates, polymeric sulfonates and mixtures thereof is added to a process fluid flowing in process equipment and conduits sought to be protected from scale formation.

Process fluids, which produce the most difficult inorganic scale formations, are characterized by the inclusion of scale forming, inorganic salts. Among the inorganic salts which create the greatest scale problems are the alkaline earth sulfates, alkaline earth carbonates and mixtures thereof. Of these salts, which form from the reaction of inorganic compounds present in dilute form in the aqueous process fluids, the most difficult to remove are barium sulfate, calcium sulfate and strontium sulfate. Of these, barium sulfate or strontium sulfate scale is particularly difficult to remove.

Many process fluid streams are characterized by the presence of alkaline earth metal salts. Important examples of such process fluids are sea water extracted during the production of undersea hydrocarbon formations; boiler and heated water systems; and the recovery of underground steam in geothermal applications.

It is noted that all of the above-mentioned process fluids not only may well contain scale forming alkaline earth salts but are also characterized by their high temperature. This is significant in that a well established class of scale inhibiting agents of the prior art, the polyacrylates, are ineffectual at elevated temperature. Those skilled in the art are aware of the effectiveness of polyacrylates in the inhibition of scale at ambient temperature. However, those skilled in the art are similarly aware of the breakdown of polyacrylates at elevated temperature.

To provide a scale inhibiting effective amount of the scale inhibiting agents of the present invention, solutions or dispersions of these agents are injected into the pool or reservoir of the process fluid containing scale-forming salts such as undesirable alkaline earth sulfates and carbonates. With the incorporation of the scale inhibition agents of the present invention the tendency of these scale-prone process fluids to deposit scale on process equipment and conduits in which they flow is eliminated or markedly decreased. For example, a petroleum formation may be injected with the scale inhibiting agents of this invention before pumping begins. Thus, a petroleum or gas reservoir, especially an undersea formation, from which scale-prone water is extracted, along with the desired hydrocarbon product, treated in accordance with the process of this invention, will not result in scale formation on the surfaces of equipment, pipes, tubes and the like in which these fluids flow.

The scale inhibiting agents within the contemplation of the present invention are polymeric sulfates, polymeric sulfonates and mixtures thereof. These polymeric sulfates and polymeric sulfonates are usually characterized by a polymeric backbone selected from the group consisting of a straight chain of hydrocarbon atoms, a branched chain of hydrocarbon atoms, a straight chain of carbon, hydrogen and oxygen atoms, a branched chain of carbon, hydrogen and oxygen atoms, a straight chain of carbon, hydrogen and nitrogen atoms, a branched chain of carbon, hydrogen and nitrogen atoms, a straight chain of carbon, hydrogen, nitrogen and oxygen atoms and a branched chain or carbon, hydrogen, nitrogen and oxygen atoms. The molecular weight of the polymeric backbone of the polymeric sulfates and polymeric sulfonates of this invention may vary between about 200 and about 10,000,000.

The sulfate or sulfonate groups of the polymeric sulfate and polymeric sulfonates may be attached directly to the backbone or may be removed from it by attachment to an alkyl or alkylaryl side chain. Alternately, the side chains which remove the sulfate or sulfonate from the polymeric backbone may contain other functional groups such as carboxyl, amine or amide groups. The sulfur-containing pendant groups may be interspersed with other functional groups along the backbone. For example, carboxylate, preferably acrylate, amine or amide groups may be included in the polymeric backbone.

Among the preferred sulfur-containing polymers utilizable in inhibiting scale in accordance with the process of the present invention cellulose sulfates, polyvinyl sulfonic acids, polystyrene sulfonates, nonylphenoxydiethoxypropane sulfonate, nonylphenoxytriethoxypropane sulfonate and maleic anhydride-polystyrene sulfonate copolymers are particularly preferred. As suggested by the wide range of molecular weight of the polymeric backbone of the polymeric sulfates and polymeric sulfonates within the contemplation of this invention, the molecular weight of the polymeric sulfates and polymeric sulfonates of this invention is not critical. That is, the polymeric sulfates and sulfonates of this invention are effective over broad molecular weight ranges.

The preferred scale inhibiting effective amount of the inhibiting agents of the present invention obviously depends on the particular polymeric sulfate, sulfonate or mixture thereof utilized as well as the concentration of scale forming ions and salts in the process fluid. However, in general, it is preferred that the concentration of the scale inhibiting agent, the sulfur-containing polymer or polymers, be present in a concentration in the range of between about 1 and about 1000 parts by weight per million parts by weight of said process fluid (ppm). More preferably, the inhibiting agent is present in a concentration of between about 2 ppm and about 100 ppm. Still more preferably, the concentration of polymeric sulfates, polymeric sulfonates and mixtures thereof present in the scale-prone process fluid is in the range of between about 10 ppm and about 80 ppm.

A unique characteristic of the scale inhibiting agents of the present invention is their stability at elevated temperatures. Those skilled in the art are aware that although many inhibiting agents are known, most are ineffective at elevated temperatures. The unique inhibiting agents of the present invention exhibit inhibiting effects at elevated temperatures equal to that obtained at ambient. Indeed, oftentimes the inhibiting effect at elevated temperatures is even more dramatic than that obtained at ambient temperature. Thus, the scale inhibiting agents may be introduced to process fluids at temperatures ranging from about 15° C. to about 150° C. More preferably, the temperature range of the fluids to which the inhibiting agents of this invention are added is in the range of about 20° C. and 85° C.

Although the invention is independent of any theory explaining the action of the inhibitors of the present invention, it is postulated that the inhibitors of the present invention interact with active growth sites on the incipient scale crystallites. When precipitation does occur, the crystals are generally rough and distorted or greatly altered in their morphologies. As a result, cohesive scale formation is prevented or easily dislodged by flowing liquids.

The invention embodied in the process of this invention will be better understood with reference to the following examples. These examples are given to illustrate the scope of the instant invention. Therefore, the invention embodied herein should not be limited thereto.

EXAMPLE 1

Preparation of Scale-Forming Aqueous Solutions

An aqueous solution was formed by adding 25 ml. of 0.002 M barium chloride to an aqueous solution of 1.0 M sodium chloride. Similarly, another solution was formed by adding 25 ml. of 0.002 M sodium sulfate to an aqueous solution of 1.0 M sodium chloride. The two solutions were combined resulting in the formation of an 0.001M aqueous solution of barium sulfate in 1.0M sodium chloride.

EXAMPLE 2

Addition of Inhibiting Agents to Scale-Forming Solutions

Nine scale inhibiting agents were added to barium sulfate-containing solutions formed in accordance with Example 1. These inhibiting agents were a potassium salt of polyvinyl sulfenic acid; a sodium salt of cellulose sulfate; sodium salts of three polystyrene sulfonates; nonylphenoxydiethoxypropane sulfonate; nonylphenoxytriethoxypropane sulfonate; and a copolymer of maleic anhydride and polystyrene sulfonate. The three sodium salts of polystyrene sulfonate had molecular weights of 70,000; 500,000; and 6,000,000.

The nine separate inhibiting agents were incorporated into the barium sulfate-containing aqueous solutions formed in accordance with the procedure of Example 1 at varying concentrations. The scale inhibiting agents were provided in amounts sufficient to provide concentrations of 1, 2, 5, 10, 20, 40, 80 and 100 parts of the sulfur-containing polymeric scale inhibiting agents per million parts by weight of the barium sulfate-containing aqueous solution.

EXAMPLE 3

Scale Inhibiting Testing of Inhibiting Agents

The effectiveness of the inhibiting agents of Example 2 was determined by visual inspection of the solutions to which the inhibiting agents were added. That is, the solutions were inspected to determine if precipitation, indicative of scale formation, occurred.

Each inhibiting agent was rated 0, 1, 2 or 3. A rating of 0 indicated immediate precipitation even after the addition of the inhibiting agent. A rating of 1 denoted the formation of a precipitate after several hours. A rating of 2 was assigned if a precipitate was noted after about 24 hours. A rating of 3 was given to those inhibiting agents which, when added to the barium sulfate solution, did not precipitate even after several days. Ratings of 1+ indicated that precipitation occurred in less than 24 hours but more than several hours. Similarly, a rating of 2+ denoted that while precipitation occurred it did not occur in the first 24 hours after addition of the inhibiting agent.

Each of the solutions were tested at 25° C. Many of these inhibiting agents were also tested at an elevated temperature, 80° C. To insure that the elevated temperature test occurred at 80° C., the samples were sealed in glass vials and immersed in an 80° C. constant temperature water bath.

The results of these tests appear in the table.

TABLE

| Inhibiting Agent | Inhibition Agent Concentration ppm | Temp., °C. | Precipitation Rating |
|---|---|---|---|
| Polyvinyl Sulfonic Acid | 1 | 25 | 0 |
| " | 2 | " | 0 |
| " | 5 | " | 1 |
| " | 10 | " | 3 |
| " | 20 | " | 3 |
| " | 40 | " | 3 |
| " | 80 | " | 3 |
| " | 100 | " | 3 |
| Polyvinyl Sulfonic Acid | 1 | 80 | 3 |
| " | 2 | " | 3 |
| " | 5 | " | 3 |
| " | 10 | " | 3 |
| " | 20 | " | 3 |
| " | 40 | " | 3 |
| " | 80 | " | 3 |
| " | 100 | " | NT |
| Cellulose Sulfate | 1 | 25 | 0 |
| " | 2 | " | 1 |
| " | 5 | " | 1 |
| " | 10 | " | 3 |
| " | 20 | " | 3 |
| " | 40 | " | 3 |
| " | 80 | " | 3 |
| " | 100 | " | 3 |
| Cellulose Sulfate | 1 | 80 | 1 |
| " | 2 | " | 2 |
| " | 5 | " | 3 |
| " | 10 | " | 3 |
| " | 20 | " | 3 |
| " | 40 | " | 3 |
| " | 80 | " | 3 |
| " | 100 | " | NT |
| Polystyrene Sulfonate (MW 70,000) | 1 | 25 | 0 |
| Polystyrene Sulfonate (MW 70,000) | 2 | " | 0 |
| Polystyrene Sulfonate (MW 70,000) | 5 | " | 0 |
| Polystyrene Sulfonate (MW 70,000) | 10 | " | 1 |
| Polystyrene Sulfonate (MW 70,000) | 20 | " | 1+ |
| Polystyrene Sulfonate (MW 70,000) | 40 | " | 2+ |
| Polystyrene Sulfonate (MW 70,000) | 80 | " | 1 |
| Polystyrene Sulfonate (MW 70,000) | 100 | " | 2 |
| Polystyrene Sulfonate (MW 70,000) | 1 | 80 | 1 |
| Polystyrene Sulfonate (MW 70,000) | 2 | " | 1+ |
| Polystyrene Sulfonate (MW 70,000) | 5 | " | 3 |
| Polystyrene Sulfonate (MW 70,000) | 10 | " | 3 |
| Polystyrene Sulfonate (MW 70,000) | 20 | " | 3 |
| Polystyrene Sulfonate (MW 70,000) | 40 | " | 3 |
| Polystyrene Sulfonate (MW 70,000) | 80 | " | 3 |
| Polystyrene Sulfonate (MW 70,000) | 100 | " | 3 |
| Polystyrene Sulfonate (MW 500,000) | 1 | 25 | 0 |
| Polystyrene Sulfonate (MW 500,000) | 2 | " | 0 |
| Polystyrene Sulfonate (MW 500,000) | 5 | " | 0 |
| Polystyrene Sulfonate (MW 500,000) | 10 | " | 1+ |
| Polystyrene Sulfonate (MW 500,000) | 20 | " | 2 |
| Polystyrene Sulfonate (MW 500,000) | 40 | " | 2+ |
| Polystyrene Sulfonate (MW 500,000) | 80 | " | 1 |
| Polystyrene Sulfonate (MW 500,000) | 100 | " | 2 |
| Polystyrene Sulfonate (MW 6,000,000) | 1 | 25 | 0 |
| Polystyrene Sulfonate (MW 6,000,000) | 2 | " | 0 |
| Polystyrene Sulfonate (MW 6,000,000) | 5 | " | 0 |
| Polystyrene Sulfonate (MW 6,000,000) | 10 | " | 1 |
| Polystyrene Sulfonate (MW 6,000,000) | 20 | " | 1 |
| Polystyrene Sulfonate (MW 6,000,000) | 40 | " | 1 |
| Polystyrene Sulfonate (MW 6,000,000) | 80 | " | 3 |
| Polystyrene Sulfonate (MW 6,000,000) | 100 | " | 3 |
| Polystyrene Sulfonate (MW 6,000,000) | 1 | 80 | Uncertain |
| Polystyrene Sulfonate (MW 6,000,000) | 2 | " | 1 |
| Polystyrene Sulfonate (MW 6,000,000) | 5 | " | 1 |
| Polystyrene Sulfonate | 10 | " | 3 |

TABLE-continued

| Inhibiting Agent | Inhibition Agent Concentration ppm | Temp., °C. | Precipitation Rating |
|---|---|---|---|
| Polystyrene Sulfonate (MW 6,000,000) | 20 | " | 3 |
| Polystyrene Sulfonate (MW 6,000,000) | 40 | " | 3 |
| Polystyrene Sulfonate (MW 6,000,000) | 80 | " | 3 |
| Polystyrene Sulfonate (MW 6,000,000) | 100 | " | 3 |
| Copolymer of Maleic Anhydride/Polystyrene Sulfonate | 1 | 25 | 0 |
| Copolymer of Maleic Anhydride/Polystyrene Sulfonate | 2 | " | 1 |
| Copolymer of Maleic Anhydride/Polystyrene Sulfonate | 5 | " | 1+ |
| Copolymer of Maleic Anhydride/Polystyrene Sulfonate | 10 | " | 1 |
| Copolymer of Maleic Anhydride/Polystyrene Sulfonate | 20 | " | 1 |
| Copolymer of Maleic Anhydride/Polystyrene Sulfonate | 40 | " | 2 |
| Copolymer of Maleic Anhydride/Polystyrene Sulfonate | 80 | " | 2 |
| Copolymer of Maleic Anhydride/Polystyrene Sulfonate | 100 | " | 2 |
| Nonylphenoxydiethoxypropane Sulfonate | 1 | 25 | 0 |
| Nonylphenoxydiethoxypropane Sulfonate | 2 | " | 0 |
| Nonylphenoxydiethoxypropane Sulfonate | 5 | " | 0 |
| Nonylphenoxydiethoxypropane Sulfonate | 10 | " | 0 |
| Nonylphenoxydiethoxypropane Sulfonate | 20 | " | 2+ |
| Nonylphenoxydiethoxypropane Sulfonate | 40 | " | 3 |
| Nonylphenoxydiethoxypropane Sulfonate | 80 | " | 3 |
| Nonylphenoxydiethoxypropane Sulfonate | 100 | " | 3 |
| Nonylphenoxytriethoxypropane Sulfonate | 1 | 25 | 0 |
| Nonylphenoxytriethoxypropane Sulfonate | 2 | " | 0 |
| Nonylphenoxytriethoxypropane Sulfonate | 5 | " | 0 |
| Nonylphenoxytriethoxypropane Sulfonate | 10 | " | 0 |
| Nonylphenoxytriethoxypropane Sulfonate | 20 | " | 3 |
| Nonylphenoxytriethoxypropane Sulfonate | 40 | " | 3 |
| Nonylphenoxytriethoxypropane Sulfonate | 80 | " | 3 |
| Nonylphenoxytriethoxypropane Sulfonate | 100 | " | 3 |
| Nonylphenoxytriethoxypropane Sulfate | 1 | 80 | 0 |
| Nonylphenoxytriethoxypropane Sulfate | 2 | " | 0 |
| Nonylphenoxytriethoxypropane Sulfate | 5 | " | 0 |
| Nonylphenoxytriethoxypropane Sulfate | 10 | " | 1+ |
| Nonylphenoxytriethoxypropane Sulfate | 20 | " | 2 |
| Nonylphenoxytriethoxypropane Sulfate | 40 | " | 3 |
| Nonylphenoxytriethoxypropane Sulfate | 80 | " | 3 |
| Nonylphenoxytriethoxypropane Sulfate | 100 | " | NT |

NT = Not Tested.

The above embodiments and examples are given to illustrate the scope and spirit of the instant invention. These embodiments and examples will make apparent, to those skilled in the art, other embodiments and examples. These other embodiments and examples are within the contemplation of the present invention. Therefore, the present invention should be limited only by the appended claims.

What is claimed is:

1. A process for inhibiting scale formation in process equipment and conduits through which scale-prone process fluids flow consisting essentially of adding a scale inhibiting effective amount of a cellulose sulfate inhibiting agent to a scale-prone process fluid flowing through process equipment and conduits.

2. A process in accordance with claim 1 wherein said process fluid contains a salt selected from the group consisting of calcium sulfate, barium sulfate, strontium sulfate and mixtures thereof.

3. A process in accordance with claim 2 wherein said process fluid is at a temperature in the range of between about 15° C. and about 100° C.

4. A process in accordance with claim 3 wherein said process fluid is at a temperature in the range of between about 20° C. and about 85° C.

5. A process in accordance with claim 1 wherein said inhibiting agent is present in a concentration in the range of between about 1 part by weight and about 1,000 parts by weight per million parts of process fluid.

6. A process in accordance with claim 5 wherein said inhibiting agent is present in a concentration in the range of between about 2 ppm and about 100 ppm.

7. A process in accordance with claim 6 wherein said inhibiting agent is present in a concentration in the range of between about 10 ppm and 80 ppm.

* * * * *